US010364877B2

(12) United States Patent
Hosokawa et al.

(10) Patent No.: US 10,364,877 B2
(45) Date of Patent: Jul. 30, 2019

(54) DRIVING FORCE DISTRIBUTING APPARATUS

(71) Applicant: JTEKT CORPORATION, Osaka-shi (JP)

(72) Inventors: Takashi Hosokawa, Takahama (JP); Shun Ohno, Anjo (JP); Hiroshi Takuno, Nukata-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 29 days.

(21) Appl. No.: 15/626,391

(22) Filed: Jun. 19, 2017

(65) Prior Publication Data

US 2017/0363196 A1 Dec. 21, 2017

(30) Foreign Application Priority Data

Jun. 21, 2016 (JP) ................................. 2016-122450

(51) Int. Cl.
| | |
|---|---|
| *F16H 48/22* | (2006.01) |
| *F16D 13/52* | (2006.01) |
| *F16H 48/08* | (2006.01) |
| *F16D 13/64* | (2006.01) |

(52) U.S. Cl.
CPC ............ *F16H 48/22* (2013.01); *F16D 13/52* (2013.01); *F16D 13/646* (2013.01); *F16H 48/08* (2013.01)

(58) Field of Classification Search
CPC .................................. F16H 48/22; F16D 13/52
See application file for complete search history.

(56) References Cited

U.S. PATENT DOCUMENTS

| | | | | |
|---|---|---|---|---|
| 9,759,308 | B2 * | 9/2017 | Suzuki | .................. B60K 17/35 |
| 2010/0062891 | A1 * | 3/2010 | Ekonen | ............. B60K 23/0808 |
| | | | | 475/223 |
| 2015/0192198 | A1 | 7/2015 | Suzuki | |

FOREIGN PATENT DOCUMENTS

JP  2015-129534  7/2015

\* cited by examiner

*Primary Examiner* — Derek D Knight
(74) *Attorney, Agent, or Firm* — Oblon, McClelland, Maier & Neustadt, L.L.P.

(57) ABSTRACT

A driving force distributing apparatus is configured to distribute a driving force from an engine to right and left wheels in a manner that the driving force is differentially transmittable to the wheels and the transmission of the driving force is interruptible. The apparatus includes: a differential case; a differential gear mechanism including a pair of side gears and a plurality of pinion gears; an intermediate shaft coupled to one of the side gears such that the intermediate shaft is not rotatable relative to this side gear; and a clutch mechanism to transmit a driving force from the intermediate shaft to one of the wheels in a manner that the transmission of the driving force is interruptible. The clutch mechanism includes: coaxial relatively rotatable first and second rotational members; and a plurality of clutch plates disposed between the rotational members. The first rotational member is spline-fitted to the intermediate shaft.

5 Claims, 4 Drawing Sheets

DRIVING FORCE DISTRIBUTING APPARATUS

INCORPORATION BY REFERENCE

The disclosure of Japanese Patent Application No. 2016-122450 filed on Jun. 21, 2016, including the specification, drawings and abstract, is incorporated herein by reference in its entirety.

BACKGROUND OF THE INVENTION

1. Field of the Invention

The invention relates generally to vehicle driving force distributing apparatuses. More particularly, the invention relates to a vehicle driving force distributing apparatus configured to distribute a driving force from a driving source of a vehicle to right and left wheels in a manner that the driving force is differentially transmittable to the right and left wheels and the transmission of the driving force is interruptible.

2. Description of the Related Art

A driving force distributing apparatus known in the related art includes: a differential gear mechanism including a pair of pinion gears and a pair of side gears meshing with the pair of pinion gears, with the gear axes of the side gears perpendicular to the gear axes of the pinion gears; and a clutch to transmit a driving force output from one of the pair of side gears to an associated one of right and left wheels in a manner that the transmission of the driving force is interruptible. The driving force distributing apparatus is configured to distribute a driving force from a driving source of a vehicle to the right and left wheels in a manner that the driving force is differentially transmittable to the right and left wheels and the transmission of the driving force is interruptible. Such a driving force distributing apparatus is disclosed in Japanese Patent Application Publication No. 2015-129534 (JP 2015-129534 A), for example.

The driving force distributing apparatus disclosed in JP 2015-129534 A includes an intermediate shaft coupled to one of the side gears of the differential gear mechanism housed in a differential case such that the intermediate shaft is not rotatable relative to this side gear. The intermediate shaft is integral with a clutch drum. The inner peripheral surface of the clutch drum is provided with a spline engagement portion. The clutch includes a plurality of outer clutch plates, and a plurality of inner clutch plates each disposed between associated ones of the outer clutch plates such that the inner and outer clutch plates are alternately arranged. The outer clutch plates are in engagement with the spline engagement portion of the clutch drum such that the outer clutch plates are not rotatable relative to the spline engagement portion. The inner clutch plates are in spline engagement with an inner shaft disposed coaxially with the intermediate shaft. A drive shaft to transmit the driving force to the left rear wheel is coupled to the inner shaft such that the drive shaft is not rotatable relative to the inner shaft.

FIG. 1 of JP 2015-129534 A illustrates the configuration of a driving force transmission system of a four-wheel drive vehicle equipped with the driving force distributing apparatus. In the driving force transmission system, the driving force distributing apparatus receives the driving force from the driving source (i.e., an engine) through a dog clutch disposed closer to the driving source (or the front wheels) than a propeller shaft. During four-wheel drive mode, the driving force is transmittable through the clutch of the driving force distributing apparatus and the dog clutch.

During two-wheel drive mode, the driving force is transmittable through the dog clutch but not transmittable through the clutch of the driving force distributing apparatus. Thus, when the vehicle travels in the two-wheel drive mode that transmits the driving force only to the front wheels, rotation of the propeller shaft and the differential case stops so as to reduce rotational resistance (e.g., viscosity resistance of lubricating oil) generated by the rotation of the propeller shaft and the differential case. This enhances fuel economy performance.

When the vehicle travels in the two-wheel drive mode, the configuration of the driving force transmission system disclosed in JP 2015-129534 A allows the right and left rear wheels to rotate, with the rotation of the differential case stopped. In this state, the right side gear of the differential gear mechanism rotates in the same direction as the right rear wheel with constant velocity. Because the left rear wheel and the intermediate shaft are disconnected from each other by the clutch of the driving force distributing apparatus in the two-wheel drive mode, the left side gear receives a rotational force from the right side gear through the pair of pinion gears and rotates in a direction opposite to the direction of the rotation of the right side gear.

In this case, the intermediate shaft that rotates together with the left side gear also rotates together with the outer clutch plates. If the intermediate shaft has poor rotational balance because of occurrence of a defect, such as distortion, during manufacture, for example, the intermediate shaft vibrates periodically in accordance with rotation speed thereof when the vehicle travels, in particular at high speed. This vibration may unfavorably affect meshing of the left side gear with the pair of pinion gears, causing the differential gear mechanism to vibrate and produce noise.

SUMMARY OF THE INVENTION

An object of the invention is to provide a vehicle driving force distributing apparatus including a differential gear mechanism and a clutch mechanism and configured to prevent the differential gear mechanism from vibrating and producing noise or reduce such vibration and noise.

A driving force distributing apparatus according to an embodiment of the invention is configured to distribute a driving force from a driving source of a vehicle to right and left wheels of the vehicle in a manner that the driving force is differentially transmittable to the right and left wheels and the transmission of the driving force is interruptible. The apparatus includes a case member, a differential gear mechanism, a driving force transmission member, and a clutch mechanism. The case member rotates upon receiving the driving force. The differential gear mechanism is housed in the case member. The differential gear mechanism includes a pair of side gears, and a plurality of pinion gears that rotate together with the case member while meshing with the pair of side gears. The driving force transmission member is coupled to one of the pair of side gears such that the driving force transmission member is not rotatable relative to this side gear. The clutch mechanism is configured to transmit a driving force from the driving force transmission member to one of the right and left wheels in a manner that the transmission of the driving force is interruptible. The clutch mechanism includes a pair of first and second rotational members, and a plurality of clutch plates. The first and second rotational members are disposed coaxially such that the first and second rotational members are rotatable relative to each other. The clutch plates are disposed between the first and second rotational members. The first rotational member of the clutch mechanism is spline-fitted to the driving force transmission member.

The driving force distributing apparatus according to this embodiment prevents the differential gear mechanism from vibrating and producing noise or reduces such vibration and noise.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
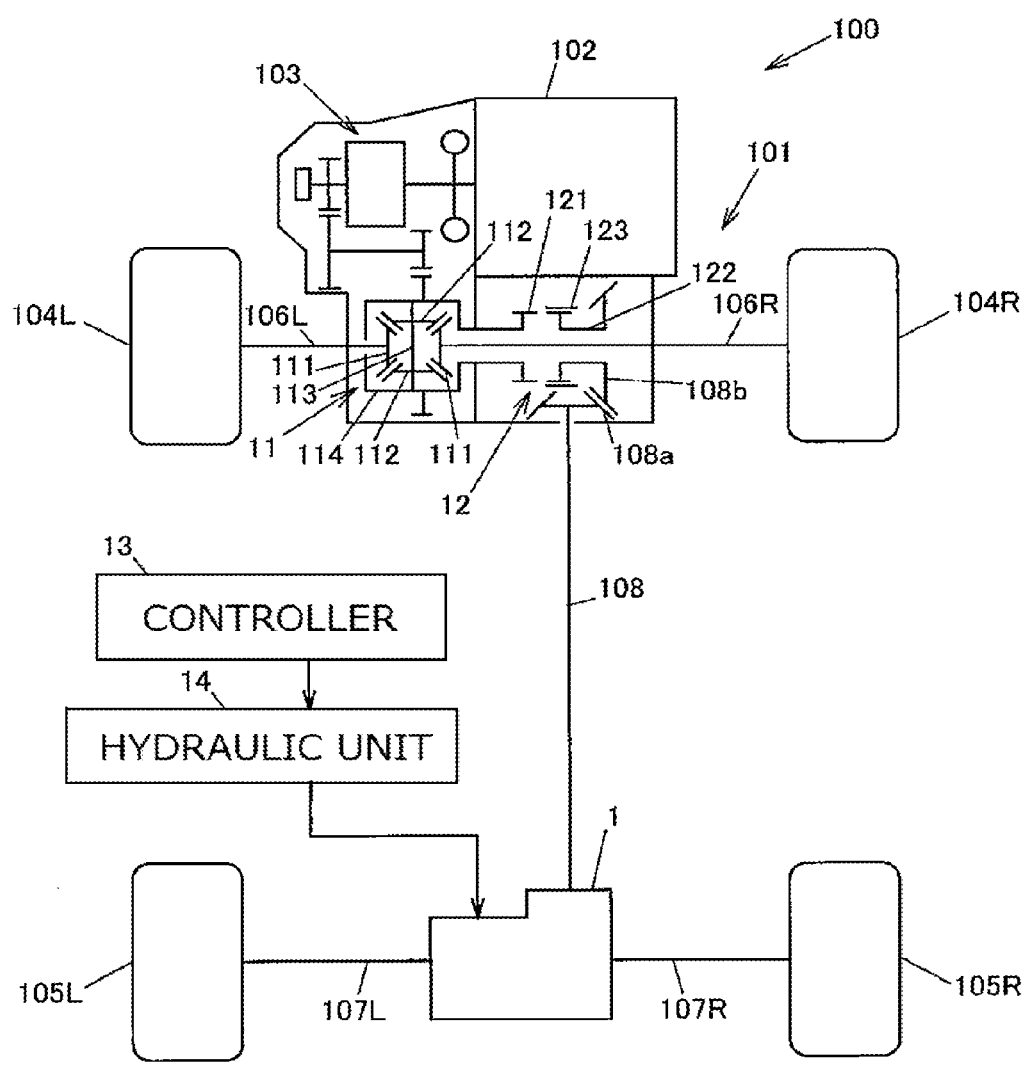
FIG. 1 is a schematic diagram illustrating an exemplary configuration of a four-wheel drive vehicle equipped with a driving force distributing apparatus according to an embodiment of the invention.

An embodiment of the invention will be described with reference to FIGS. 1 to 4B. FIG. 1 is a schematic diagram illustrating an exemplary configuration of a four-wheel drive vehicle 100 equipped with a driving force distributing apparatus 1 according to an embodiment of the invention.

The four-wheel drive vehicle 100 includes: an engine 102 serving as a driving source to generate a driving force for traveling; a transmission 103; front wheels 104R and 104L serving as a pair of right and left main driving wheels; rear wheels 105R and 105L serving as a pair of right and left auxiliary driving wheels; a driving force transmission system 101 to transmit a driving force generated by the engine 102 to the front wheels 104R and 104L and the rear wheels 105R and 105L; a controller 13; and a hydraulic unit 14. In this embodiment, the reference signs R and L are used to represent right and left with respect to the direction of forward movement of the four-wheel drive vehicle 100.

The four-wheel drive vehicle 100 is allowed to switch between a four-wheel drive mode and a two-wheel drive mode. In the four-wheel drive mode, the driving force generated by the engine 102 is transmitted to the front wheels 104R and 104L and the rear wheels 105R and 105L. In the two-wheel drive mode, the driving force generated by the engine 102 is transmitted to only the front wheels 104R and 104L. Although this embodiment will be described on the assumption that the driving source is an internal combustion engine, the driving source is not limited to an internal combustion engine. The driving source may be a combination of an engine and a high-power motor, such as an interior permanent magnet (IPM) synchronous motor, or may consist of a high-power motor.

The driving force transmission system 101 includes: a front differential 11; a dog clutch 12 capable of interrupting transmission of the driving force; a propeller shaft 108; the driving force distributing apparatus 1; front wheel drive shafts 106R and 106L; and rear wheel drive shafts 107R and 107L. When the four-wheel drive vehicle 100 is traveling, the driving force generated by the engine 102 is constantly transmitted to the front wheels 104R and 104L. The driving force generated by the engine 102 is transmitted to the rear wheels 105R and 105L through the dog clutch 12, the propeller shaft 108, and the driving force distributing apparatus 1. The driving force distributing apparatus 1 is configured to distribute the driving force from the engine 102 to the right and left rear wheels 105R and 105L in a manner that the driving force is differentially transmittable to the rear wheels 105R and 105L and the transmission of the driving force is interruptible.

The front differential 11 includes: a pair of side gears 111 each coupled to an associated one of the pair of front wheel drive shafts 106R and 106L; a pair of pinion gears 112 meshing with the pair of side gears 111, with the gear axes of the pinion gears 112 perpendicular to the gear axes of the side gears 111; a pinion gear support 113 supporting the pair of pinion gears 112; and a front differential case 114 housing the pair of side gears 111, the pair of pinion gears 112, and the pinion gear support 113.

The dog clutch 12 includes: a first rotational member 121 that rotates together with the front differential case 114; a second rotational member 122 disposed in axial alignment with the first rotational member 121; and a sleeve 123 configured to couple the first and second rotational members 121 and 122 to each other such that the first and second rotational members 121 and 122 are not rotatable relative to each other. An actuator (not illustrated) causes the sleeve 123 to axially move between a coupling position and a non-coupling position. At the coupling position, the sleeve 123 is in engagement with the first and second rotational members 121 and 122. At the non-coupling position, the sleeve 123 is in engagement only with the second rotational member 122. When the sleeve 123 is at the coupling position, the first and second rotational members 121 and 122 are coupled to each other such that the first and second rotational members 121 and 122 are not rotatable relative to each other. When the sleeve 123 is at the non-coupling position, the first and second rotational members 121 and 122 are rotatable relative to each other.

Upon receiving torque from the engine 102 through the front differential case 114 and the dog clutch 12, the propeller shaft 108 transmits the torque to the driving force distributing apparatus 1. The front wheel side end of the propeller shaft 108 is provided with a pinion gear 108a. The pinion gear 108a meshes with a ring gear 108b. The ring gear 108b is coupled to the second rotational member 122 of the dog clutch 12 such that the ring gear 108b is not rotatable relative to the second rotational member 122.

The engine 102 outputs the driving force to the pair of front wheel drive shafts 106R and 106L through the transmission 103 and the front differential 11 so as to drive the pair of front wheels 104R and 104L. The engine 102 outputs the driving force to the rear wheel drive shafts 107R and 107L through the transmission 103, the dog clutch 12, the propeller shaft 108, and the driving force distributing apparatus 1 so as to drive the pair of rear wheels 105R and 105L.

The driving force distributing apparatus 1 distributes the driving force received from the propeller shaft 108 to the rear wheel drive shafts 107R and 107L in a manner that the driving force is differentially transmittable to the rear wheel drive shafts 107R and 107L. The drive shaft 107L is coupled to the left rear wheel 105L, and the drive shaft 107R is coupled to the right rear wheel 105R.

The controller 13 controls the hydraulic unit 14 so as to cause the hydraulic unit 14 to supply hydraulic oil to the driving force distributing apparatus 1. The pressure of the hydraulic oil activates the driving force distributing apparatus 1 so as to transmit the driving force from the propeller shaft 108 to the rear wheel drive shafts 107R and 107L. As used herein, the term "differential rotation speed" refers to a difference between an average rotation speed of the front wheels 104R and 104L and an average rotation speed of the rear wheels 105R and 105L. The controller 13 controls the hydraulic unit 14 such that the higher the differential rotation speed and the greater the accelerator pedal stepping amount by the driver, the higher the pressure of hydraulic oil to be supplied to the driving force distributing apparatus 1.

Figure 2:
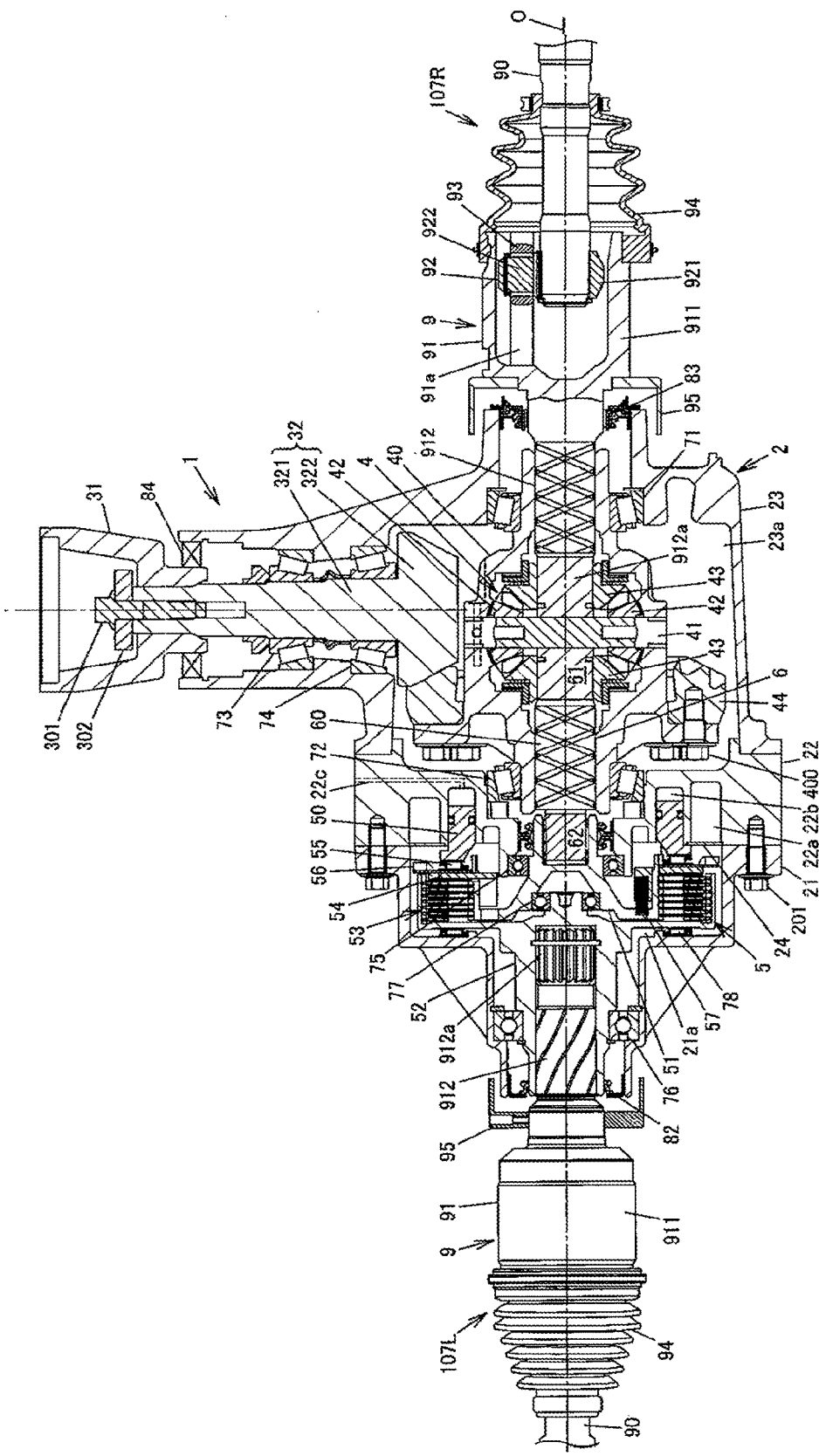
FIG. 2 is a horizontal cross-sectional view of an exemplary configuration of the driving force distributing apparatus.
Figure 3:
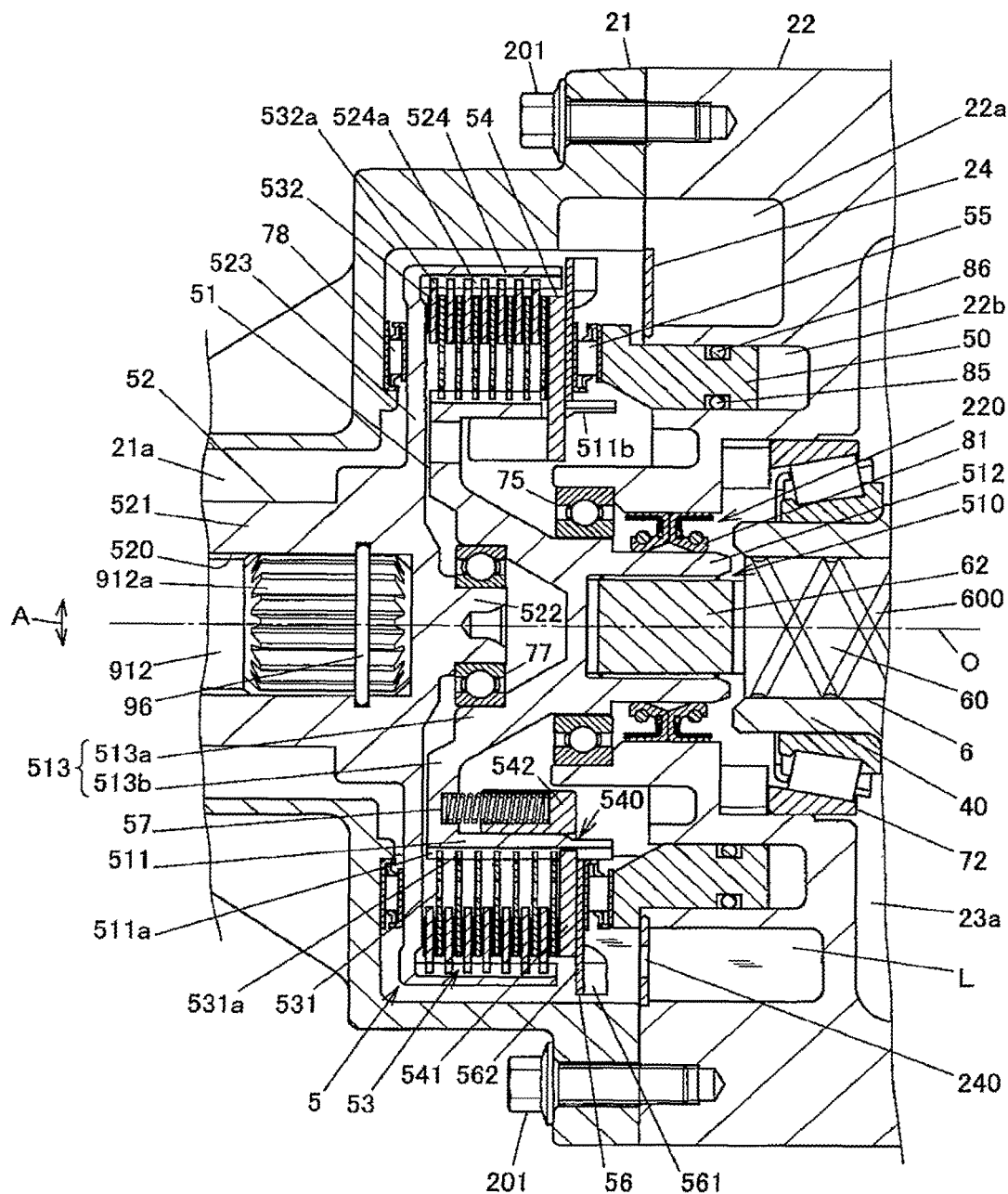
FIG. 3 is a vertical cross-sectional view of principal components of the driving force distributing apparatus.

FIG. 2 is a horizontal cross-sectional view of an exemplary configuration of the driving force distributing apparatus 1. FIG. 3 is a vertical cross-sectional view of principal components of the driving force distributing apparatus 1. FIG. 2 illustrates an entirety of the driving force distributing apparatus 1 and portions of the rear wheel drive shafts 107R and 107L. The upper part of FIG. 3 illustrates vertically upper portions of the principal components of the driving force distributing apparatus 1 installed on the four-wheel drive vehicle 100. The lower part of FIG. 3 illustrates vertically lower portions of the principal components of the driving force distributing apparatus 1 installed on the four-wheel drive vehicle 100.

The driving force distributing apparatus 1 includes an apparatus case 2, a connector 31, a pinion gear shaft 32, a differential case 40, a differential gear mechanism 4, a clutch mechanism 5, and an intermediate shaft 6. The apparatus case 2 is supported by the body of the four-wheel drive vehicle 100. The connector 31 is connected with the propeller shaft 108. The pinion gear shaft 32 rotates together with the connector 31. The differential case 40 is a case member that rotates upon receiving the driving force from the engine 102 through the pinion gear shaft 32.

The differential gear mechanism 4 includes: a pinion shaft 41 supported by the differential case 40; a pair of pinion gears 42 rotatably supported by the pinion shaft 41; and a pair of side gears 43 meshing with the pair of pinion gears 42, with the gear axes of the side gears 43 perpendicular to the gear axes of the pinion gears 42. The pair of pinion gears 42 rotate together with the differential case 40 while meshing with the pair of side gears 43. The driving force received by the differential case 40 is output from the pair of side gears 43 of the differential gear mechanism 4 such that the driving force is differentially transmittable. The clutch mechanism 5 transmits the driving force output from one of the side gears 43 to the left rear wheel 105L. The intermediate shaft 6 is a driving force transmission member disposed between the differential gear mechanism 4 and the clutch mechanism 5.

The pair of pinion gears 42 and the pair of side gears 43 are bevel gears. The differential case 40 houses the differential gear mechanism 4. The widthwise ends of the differential case 40 are rotatably supported by the apparatus case 2 via tapered roller bearings 71 and 72. The intermediate shaft 6 is coupled to one of the pair of side gears 43 such that the intermediate shaft 6 is not rotatable relative to this side gear 43. The clutch mechanism 5 transmits the driving force from the intermediate shaft 6 to the left rear wheel 105L in a manner that the transmission of the driving force is interruptible.

The connector 31 and the pinion gear shaft 32 are connected to each other with a bolt 301 and a washer 302. The pinion gear shaft 32 includes a shaft portion 321 and a gear portion 322. The shaft portion 321 is rotatably supported by a pair of tapered roller bearings 73 and 74. The gear portion 322 meshes with a ring gear 44. The ring gear 44 is secured to the differential case 40 with a plurality of bolts 400 such that the ring gear 44 rotates together with the differential case 40.

On a driving force transmission path leading to the drive shaft 107L, the clutch mechanism 5 is disposed between the intermediate shaft 6 and the drive shaft 107L. Suppose that the driving force transmitted to the drive shaft 107L from one of the side gears 43 through the intermediate shaft 6 and the clutch mechanism 5 is adjusted during straight forward movement of the four-wheel drive vehicle 100. In this case, the differential gear mechanism 4 performs its differential function, so that a driving force equivalent to the driving force transmitted to the drive shaft 107L is transmitted to the drive shaft 107R.

The drive shafts 107R and 107L each include: an intermediate shaft 90; a tripod constant velocity joint 9 disposed on one end of the intermediate shaft 90; and a ball constant velocity joint (not illustrated) disposed on the other end of the intermediate shaft 90. The ball constant velocity joints of the drive shafts 107R and 107L are each coupled to a hub unit (not illustrated) supporting an associated one of the rear wheels 105R and 105L.

Each tripod constant velocity joint 9 includes an outer ring 91, a tripod member 92, and rollers 93. The outer ring 91 includes a bottomed tubular cup portion 911 and a shaft-like stem portion 912. The inner peripheral surface of the cup portion 911 is provided with three axially extending roller guide grooves 91a. The stem portion 912 is integral with the bottom of the cup portion 911 and protruded from the bottom of the cup portion 911. The tripod member 92 includes an annular boss 921 and three tripod shaft portions 922. The boss 921 is coupled to the intermediate shaft 90 such that the intermediate shaft 90 is not rotatable relative to the boss 921. The tripod shaft portions 922 extend radially outward from the boss 921. Each roller 93 is rotatably supported by an associated one of the tripod shaft portions 922 and rolls along an associated one of the roller guide grooves 91a.

The cup portion 911 of each outer ring 91 defines an opening. This opening is covered with a bellows-like boot 94. A deflector 95 is fitted to each stem portion 912. Each deflector 95 prevents intrusion of foreign matter into the driving force distributing apparatus 1. An end of each stem portion 912 is provided with a spline-fitted portion 912a. Each spline-fitted portion 912a is provided with spline teeth. FIG. 2 illustrates a cross section of the tripod constant velocity joint 9 of the drive shaft 107R taken along the axis of the drive shaft 107R. In FIG. 2, one of the three tripod shaft portions 922 disposed inside the outer ring 91 is illustrated.

The spline-fitted portion 912a of the stem portion 912 of the drive shaft 107R is spline-fitted to one of the pair of side gears 43 away from the intermediate shaft 6 such that the spline-fitted portion 912a of the stem portion 912 of the drive shaft 107R is not rotatable relative to this side gear 43. The spline-fitted portion 912a of the stem portion 912 of the drive shaft 107L is spline-fitted to a connector 521 of a second rotational member 52 such that the spline-fitted portion 912a of the stem portion 912 of the drive shaft 107L is not rotatable relative to the connector 521. The second rotational member 52 will be described in the following paragraph.

The clutch mechanism 5 includes a piston 50, a first rotational member 51, the second rotational member 52, a frictional clutch 53, a pressure plate 54, and a thrust roller bearing 55. The piston 50 is a pressing member that moves upon receiving the pressure of hydraulic oil supplied from the hydraulic unit 14. The first rotational member 51 rotates together with the intermediate shaft 6. The second rotational member 52 rotates together with the outer ring 91 of the tripod constant velocity joint 9 of the drive shaft 107L. The frictional clutch 53 is disposed between the first rotational member 51 and the second rotational member 52. The pressure plate 54 and the thrust roller bearing 55 are disposed between the piston 50 and the frictional clutch 53. The first and second rotational members 51 and 52 are disposed coaxially such that the first and second rotational members 51 and 52 are rotatable relative to each other. The first rotational member 51, the second rotational member 52, and the intermediate shaft 6 have the same rotation axis O. A direction parallel to the rotation axis O will hereinafter be referred to as an "axial direction". The first and second rotational members 51 and 52 are equivalent to a pair of first and second rotational members according to the invention.

As illustrated in FIG. 3, the frictional clutch 53 includes a plurality of inner clutch plates 531 that rotate together with the first rotational member 51, and a plurality of outer clutch plates 532 that rotate together with the second rotational member 52. The inner and outer clutch plates 531 and 532 are lubricated with lubricating oil L so as to facilitate frictional sliding of the inner and outer clutch plates 531 and 532. In this embodiment, the number of inner clutch plates 531 included in the frictional clutch 53 is seven, and the number of outer clutch plates 532 included in the frictional clutch 53 is also seven. The seven inner clutch plates 531 and the seven outer clutch plates 532 are alternately arranged in the axial direction.

The frictional clutch 53 receives a pressing force from the piston 50 through the pressure plate 54 and the thrust roller bearing 55. Thus, a frictional force is produced between the inner and outer clutch plates 531 and 532. This frictional force causes the driving force to be transmitted between the first and second rotational members 51 and 52. The piston 50 has an annular shape whose center corresponds to the rotation axis O. The clutch mechanism 5 further includes a scraper 56. The scraper 56 includes a plurality of blades 561 to scrape the lubricating oil L, and a flat plate portion 562. The flat plate portion 562 is disposed between the pressure plate 54 and the thrust roller bearing 55. The blades 561 are protruded from the flat plate portion 562 in the axial direction.

The first rotational member 51 includes a cylindrical portion 511, a bottomed cylindrical connector 512, and a connection 513. The outer peripheral surface of the cylindrical portion 511 is provided with a spline engagement portion 511a. The spline engagement portion 511a includes a plurality of spline protrusions extending in the axial direction. The connector 512 is smaller in diameter than the cylindrical portion 511. The intermediate shaft 6 is spline-fitted to the connector 512. The cylindrical portion 511 and the connector 512 are connected to each other through the connection 513. The first rotational member 51 is formed by forging and cutting ferrous metal, for example.

The connection 513 includes: a conical portion 513a having a tapered outer peripheral surface; and a flange 513b projecting outward from a large-diameter end of the conical portion 513a. A small-diameter end of the conical portion 513a is integral with the connector 512. An outer peripheral end of the flange 513b is integral with the cylindrical portion 511. An end of the cylindrical portion 511 opposite to the flange 513b is provided with a plurality of protrusions 511b protruding in the axial direction.

The pressure plate 54 is provided with insertion holes 540. The protrusions 511b of the cylindrical portion 511 are each inserted through an associated one of the insertion holes 540. Thus, the pressure plate 54 is not rotatable relative to the first rotational member 51 but is movable in the axial direction. The pressure plate 54 includes: a pressing portion 541 disposed outward of the cylindrical portion 511; and an inner wall 542 disposed inward of the cylindrical portion 511. The pressing portion 541 is configured to press the frictional clutch 53. The insertion holes 540 are provided between the pressing portion 541 and the inner wall 542. The inner peripheral end of the flat plate portion 562 of the scraper 56 is in engagement with the spline engagement portion 511a of the first rotational member 51.

A plurality of coil springs 57 are disposed between the inner wall 542 of the pressure plate 54 and the flange 513b of the connection 513 of the first rotational member 51, with the coil springs 57 compressed in the axial direction. FIGS. 2 and 3 illustrate one of the coil springs 57. The coil springs 57 urge the pressure plate 54 toward the piston 50.

The second rotational member 52 is disposed in alignment with the first rotational member 51 in the axial direction. As illustrated in FIG. 3, the second rotational member 52 integrally includes the connector 521, a boss 522, an annular wall 523, and a cylindrical portion 524. The connector 521 is coupled to the stem portion 912 of the tripod constant velocity joint 9 of the drive shaft 107L. The boss 522 is protruded in the axial direction from an end of the connector 521 adjacent to the first rotational member 51. The wall 523 projects outward from the connector 521. The cylindrical portion 524 extends in the axial direction from the outer peripheral end of the wall 523.

The connector 521 is provided with a fitting hole 520. The stem portion 912 of the drive shaft 107L is fitted into the fitting hole 520. The inner surface of the fitting hole 520 is provided with spline protrusions (not illustrated). The spline-fitted portion 912a of the stem portion 912 of the drive shaft 107L is in engagement with the spline protrusions such that the spline-fitted portion 912a is not rotatable relative to the spline protrusions. A snap ring 96 is fitted to the outer peripheral surface of the spline-fitted portion 912a. The snap ring 96 prevents the stem portion 912 from coming out of the fitting hole 520.

The frictional clutch 53 is disposed between the cylindrical portion 511 of the first rotational member 51 and the cylindrical portion 524 of the second rotational member 52. The inner peripheral end of each inner clutch plate 531 is provided with a plurality of protrusions 531a. The protrusions 531a are in engagement with the spline engagement portion 511a of the cylindrical portion 511 of the first rotational member 51. Thus, the inner clutch plates 531 are coupled to the first rotational member 51 such that the inner clutch plates 531 are movable in the axial direction but not rotatable relative to the first rotational member 51. The outer peripheral end of each outer clutch plate 532 is provided with a plurality of protrusions 532a. The inner peripheral surface of the cylindrical portion 524 of the second rotational member 52 is provided with a spline engagement portion 524a. The protrusions 532a are in engagement with the spline engagement portion 524a. Thus, the outer clutch plates 532 are coupled to the second rotational member 52 such that the outer clutch plates 532 are movable in the axial direction but not rotatable relative to the second rotational member 52.

The first rotational member 51 is supported by a ball bearing 75 disposed in an axial hole 220 in a central portion of a second case member 22. The second rotational member 52 is supported by a ball bearing 76 disposed between the connector 521 and the inner surface of a first case member 21. A ball bearing 77 is disposed between the inner peripheral surface of the conical portion 513a of the first rotational member 51 and the outer peripheral surface of the boss 522 of the second rotational member 52. The ball bearings 75, 76, and 77 each include: an outer ring provided at its inner peripheral surface with an outer raceway surface; an inner ring provided at its outer peripheral surface with an inner raceway surface; and spherical rolling elements that roll along the inner and outer raceway surfaces.

A thrust roller bearing 78 is disposed between the wall 523 of the second rotational member 52 and the inner surface of the first case member 21. The thrust roller bearing 78 restricts axial movement of the second rotational member 52 caused by a pressing force from the piston 50.

The apparatus case 2 includes the first case member 21, the second case member 22, a third case member 23, and a partition 24. The first case member 21 defines a housing chamber 21a housing the clutch mechanism 5. The second case member 22 defines a storage chamber 22a storing the lubricating oil L to lubricate the frictional clutch 53. The third case member 23 defines a housing chamber 23a housing the differential case 40 and other components. The partition 24 is disposed between the housing chamber 21a and the storage chamber 22a. The first case member 21 and the second case member 22 are connected to each other by fastening with bolt(s) or welding, for example. The second case member 22 and the third case member 23 are connected to each other by fastening with bolt(s) or welding, for example. In FIGS. 2 and 3, the first case member 21 and the second case member 22 are connected to each other with a plurality of bolts 201.

A seal 81 is secured to the inner peripheral surface of the axial hole 220 in the second case member 22. In the apparatus case 2, the seal 81 serves as a partition between the housing chamber 21a defined by the first case member 21 and the housing chamber 23a defined by the third case member 23. The housing chamber 21a is filled with the lubricating oil L having viscosity suitable for lubrication of the inner and outer clutch plates 531 and 532 of the frictional clutch 53 so as to facilitate frictional sliding of the inner and outer clutch plates 531 and 532. The housing chamber 23a defined by the third case member 23 is filled with differential oil (not illustrated) having viscosity suitable for gear lubrication.

The first case member 21 is provided with an insertion hole. The second rotational member 52 is inserted into the insertion hole of the first case member 21. A seal 82 is fitted to the inner surface of the insertion hole of the first case member 21. The third case member 23 is provided with a first insertion hole through which the stem portion 912 of the outer ring 91 of the drive shaft 107R is inserted. A seal 83 is fitted to the inner surface of the first insertion hole of the third case member 23. The third case member 23 is further provided with a second insertion hole through which the connector 31 and the pinion gear shaft 32 are inserted. A seal 84 is fitted to the inner surface of the second insertion hole of the third case member 23.

The second case member 22 is provided with an annular cylinder chamber 22b and a hydraulic oil supply hole 22c (see FIG. 2). Through the hydraulic oil supply hole 22c, hydraulic oil is supplied to the cylinder chamber 22b. The hydraulic oil supplied to the cylinder chamber 22b applies oil pressure to the piston 50 so as to move the piston 50 toward the frictional clutch 53.

The storage chamber 22a and the cylinder chamber 22b each have an annular shape whose center corresponds to the rotation axis O such that the storage chamber 22a and the cylinder chamber 22b are concentric with each other. In the second case member 22, the storage chamber 22a is provided outward of the cylinder chamber 22b. The storage chamber 22a and the cylinder chamber 22b are both in communication with the housing chamber 21a defined by the first case member 21. The storage chamber 22a and the cylinder chamber 22b are recessed toward the third case member 23 along the rotation axis O. A recessed opening defined by the storage chamber 22a is partially closed by the annular partition 24. The partition 24 is secured to the second case member 22 by welding or swaging, for example.

As illustrated in FIG. 3, the upper end of the storage chamber 22a is bulged upward of the outer peripheral end of the partition 24. Through this bulged portion, the lubricating oil L scraped by the blades 561 of the scraper 56 is guided into the storage chamber 22a. The upper end of the housing chamber 21a of the first case member 21 is provided with a cut-out. Through this cut-out, the lubricating oil L scraped by the blades 561 is guided into the storage chamber 22a. The lower end of the partition 24 is provided with a guide hole 240. Through the guide hole 240, the lubricating oil L stored in the storage chamber 22a is guided to the housing chamber 21a.

When the lubricating oil L in the housing chamber 21a is scraped by the rotation of the scraper 56, a portion of the lubricating oil L scraped is guided into the storage chamber 22a. The higher the rotation speed of the second rotational member 52, the larger the amount of the lubricating oil L guided into the storage chamber 22a. The higher the oil level in the storage chamber 22a, the larger the amount of the lubricating oil L guided to the housing chamber 21a through the guide hole 240 of the partition 24.

During acceleration (i.e., when the vehicle speed increases), the amount of the lubricating oil L stored in the storage chamber 22a increases, and the amount of the lubricating oil L in the housing chamber 21a decreases. During deceleration, the amount of the lubricating oil L stored in the storage chamber 22a decreases, and the amount of the lubricating oil L in the housing chamber 21a increases. Thus, the apparatus case 2 is configured so that the lubricating oil L scraped by the rotation of the scraper 56 is guided into the storage chamber 22a, and the lubricating oil L stored in the storage chamber 22a is returned to the housing chamber 21a through the guide hole 240 of the partition 24.

Hydraulic oil is supplied from the hydraulic unit 14 to the cylinder chamber 22b through the hydraulic oil supply hole 22c. The piston 50 is movable forward and rearward along the rotation axis O), with a portion of the piston 50 axially disposed in the cylinder chamber 22b. The oil pressure of the hydraulic oil supplied to the cylinder chamber 22b moves the piston 50 further into the housing chamber 21a so as to press the frictional clutch 53. When the pressure of the hydraulic oil in the cylinder chamber 22b decreases, the piston 50 receives an urging force from the coil springs 57 through the pressure plate 54 and thus moves toward the bottom of the cylinder chamber 22b and away from the frictional clutch 53. The inner and outer peripheral surfaces of the piston 50 are each provided with a circumferential groove. An O-ring 85 (see FIG. 3) is retained in the circumferential groove in the inner peripheral surface of the piston 50. An O-ring 86 (see FIG. 3) is retained in the circumferential groove in the outer peripheral surface of the piston 50. With forward and rearward movement of the piston 50, the O-rings 85 and 86 slide along the inner surface of the cylinder chamber 22b.

The intermediate shaft 6 integrally includes: a columnar shaft portion 60; a first spline-fitted portion 61 spline-fitted to one of the side gears 43 of the differential gear mechanism 4; and a second spline-fitted portion 62 spline-fitted to the first rotational member 51 of the clutch mechanism 5. The shaft portion 60 is in alignment with the first and second spline-fitted portions 61 and 62 in the axial direction. The first spline-fitted portion 61 is provided on an end of the shaft portion 60 adjacent to the differential gear mechanism 4. The second spline-fitted portion 62 is provided on an end of the shaft portion 60 adjacent to the clutch mechanism 5. The outer peripheral surface of the shaft portion 60 is provided with an oil groove 600 (see FIG. 3) having a grid pattern that allows differential oil to flow therethrough.

Figure 4A:
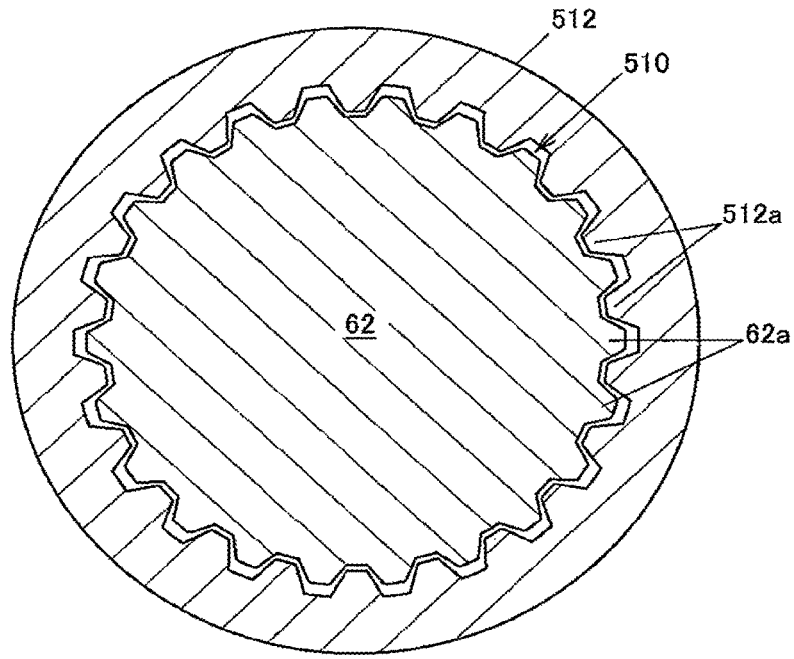
FIG. 4A is a cross-sectional view of a connector of a first rotational member and a second spline-fitted portion of an intermediate shaft taken in a direction perpendicular to the axes of the first rotational member and the intermediate shaft.
Figure 4B:
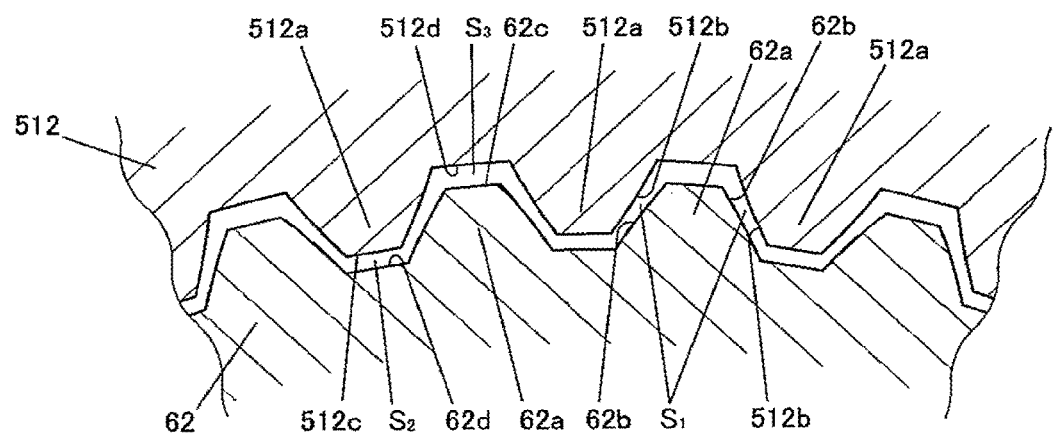
FIG. 4B is an enlarged view of a portion of FIG. 4A.

FIG. 4A is a cross-sectional view of the connector 512 of the first rotational member 51 and the second spline-fitted portion 62 of the intermediate shaft 6 taken in a direction perpendicular to the axes of the first rotational member 51 and the intermediate shaft 6. FIG. 4B is an enlarged view of a portion of FIG. 4A.

The connector 512 of the first rotational member 51 is provided with a fitting hole 510. The second spline-fitted portion 62 of the intermediate shaft 6 is fitted into the fitting hole 510. The inner peripheral surface of the fitting hole 510 is provided with inner peripheral spline teeth 512a. The inner peripheral spline teeth 512a are internal teeth. The inner peripheral spline teeth 512a are provided at regular intervals in the circumferential direction of the inner peripheral surface of the fitting hole 510. The inner peripheral spline teeth 512a extend in the axial direction.

The outer peripheral surface of the second spline-fitted portion 62 of the intermediate shaft 6 is provided with outer peripheral spline teeth 62a. The outer peripheral spline teeth 62a are external teeth. The outer peripheral spline teeth 62a are equal in number to the inner peripheral spline teeth 512a. The outer peripheral spline teeth 62a are provided at regular intervals in the circumferential direction of the outer peripheral surface of the second spline-fitted portion 62. The outer peripheral spline teeth 62a extend in the axial direction.

The inner peripheral spline teeth 512a and the outer peripheral spline teeth 62a mesh with each other. Thus, the first rotational member 51 and the intermediate shaft 6 are coupled to each other such that the first rotational member 51 and the intermediate shaft 6 are not rotatable relative to each other but are movable relative to each other in the axial direction. Tooth surfaces 512b of the inner peripheral spline teeth 512a and tooth surfaces 62b of the outer peripheral spline teeth 62a each assume an involute curve.

FIGS. 4A and 4B illustrate the first rotational member 51 and the intermediate shaft 6 disposed coaxially, with each of the outer peripheral spline teeth 62a located in the middle between a circumferentially adjacent pair of the inner peripheral spline teeth 512a. In this state, a circumferential gap S1 is provided between the tooth surface 512b of each inner peripheral spline tooth 512a and the tooth surface 62b of the associated outer peripheral spline tooth 62a. A radial gap S2 is provided between a tip surface 512c of each inner peripheral spline tooth 512a and a bottom surface 62d of the associated outer peripheral spline tooth 62a. A radial gap S3 is provided between a tip surface 62c of each outer peripheral spline tooth 62a and a bottom surface 512d of the associated inner peripheral spline tooth 512a.

The second spline-fitted portion 62 of the intermediate shaft 6 is loose-fitted to the fitting hole 510 of the connector 512 of the first rotational member 51. The second spline-fitted portion 62 is easily manually inserted into and removed from the fitting hole 510 by a worker, for example. Loose-fitting the second spline-fitted portion 62 of the intermediate shaft 6 to the connector 512 of the first rotational member 51 allows the first rotational member 51 to oscillate in a radial direction with respect to the intermediate shaft 6 (i.e., in the direction indicated by the arrow A in FIG. 3) within a predetermined angular range (e.g., within the range of ±1 to 3 degrees).

The first spline-fitted portion 61 of the intermediate shaft 6 is spline-fitted to the associated side gear 43 of the differential gear mechanism 4. This means that the first spline-fitted portion 61 is closely fitted to the associated side gear 43 unlike the way the second spline-fitted portion 62 is fitted to the connector 512 of the first rotational member 51. In other words, backlash between the first spline-fitted portion 61 of the intermediate shaft 6 and the associated side gear 43 in the direction of rotation is smaller than backlash between the second spline-fitted portion 62 of the intermediate shaft 6 and the first rotational member 51 in the direction of rotation.

The effects of the connection between the first rotational member 51 and the intermediate shaft 6 according to this embodiment will be described below. The first rotational member 51 is formed by forging and cutting as previously mentioned, and a component of the first rotational member 51, such as the spline engagement portion 511a, is heat-treated when necessary. In the course of these processes, distortion may occur, resulting in rotational imbalance. In such a case, if the four-wheel drive vehicle 100 travels in the two-wheel drive mode, the first rotational member 51 will shake during rotation.

Suppose that the first rotational member 51 and the intermediate shaft 6 are connected to each other by welding or fastening with bolt(s), for example. In such a case, vibrations caused by shaking of the first rotational member 51 during rotation are transmitted to the intermediate shaft 6 and then to one of the side gears 43 of the differential gear mechanism 4. This causes this side gear 43 to vibrate. The vibration of this side gear 43 may lead to poor meshing of the side gear 43 with the pair of pinion gears 42 and may thus produce noise responsive to the meshing order. Such noise may make occupant(s) in the four-wheel drive vehicle 100 feel uncomfortable or insecure. The noise grows louder as the traveling speed of the four-wheel drive vehicle 100 increases.

In this embodiment, however, the first rotational member 51 and the intermediate shaft 6 are spline-fitted to each other such that the first rotational member 51 and the intermediate shaft 6 are not rotatable relative to each other but are movable in the axial direction. Thus, if the first rotational member 51 shakes during rotation, the resulting vibration is unlikely to be transmitted to the intermediate shaft 6. Specifically, the vibration of the first rotational member 51 is absorbed by backlash (i.e., the gaps S1, S2, and S3) between the connector 512 of the first rotational member 51 and the second spline-fitted portion 62 of the intermediate shaft 6 so as to maintain suitable meshing of the side gear 43 coupled to the intermediate shaft 6 with the pair of pinion gears 42. Consequently, this embodiment prevents the differential gear mechanism 4 from vibrating and producing noise or reduces such vibration and noise.

During traveling in the four-wheel drive mode, the rotation speed of the pair of side gears 43 relative to the differential case 40 is zero or low in accordance with the differential rotation speed of the right and left rear wheels 105R and 105L, thus preventing noise resulting from poor meshing of the side gears 43 with the pinion gears 42. Accordingly, this embodiment of the invention effectively solves problems specific to a driving force distributing apparatus provided with a clutch mechanism configured to transmit a driving force between one of a pair of side gears of a differential gear mechanism and one of wheels in a manner that the transmission of the driving force is interruptible.

Modifications may be made to the foregoing embodiment of the invention, where appropriate, without departing from the spirit of the invention. Although the foregoing embodiment has been described on the assumption that the pressing member to press the frictional clutch 53 is the piston 50 configured to move upon receiving the pressure of hydraulic oil, the frictional clutch 53 may be pressed in any other suitable manner. In one example, the frictional clutch 53 may be pressed by cam thrust produced by a cam mechanism to be actuated by torque output from a motor. In such a case, for example, a cam member that is a component of the cam mechanism serves as the pressing member to press the frictional clutch 53.

The foregoing embodiment has been described on the assumption that the second spline-fitted portion 62 of the intermediate shaft 6 is spline-fitted into the fitting hole 510 in the connector 512 of the first rotational member 51. Alternatively, the first rotational member 51 and the intermediate shaft 6 may be coupled to each other in a reverse manner. This means that a portion of the first rotational member 51 may be fitted into a fitting hole in the intermediate shaft 6 so as to couple the first rotational member 51 and the intermediate shaft 6 to each other. In this case, the first rotational member 51 is provided with outer peripheral spline teeth, and the intermediate shaft 6 is provided with inner peripheral spline teeth.

What is claimed is:

1. A driving force distributing apparatus configured to distribute a driving force from a driving source of a vehicle to right and left wheels of the vehicle in a manner that the driving force is differentially transmittable to the right and left wheels and the transmission of the driving force is interruptible, the apparatus comprising;
    a case member that rotates upon receiving the driving force;
    a differential gear mechanism housed in the case member, the differential gear mechanism including a pair of side gears, and a plurality of pinion gears that rotate together with the case member while meshing with the pair of side gears;
    a driving force transmission member coupled to one of the pair of side gears such that the driving force transmission member is not rotatable relative to this side gear; and
    a clutch mechanism to transmit a driving force from the driving force transmission member to one of the right and left wheels in a manner that the transmission of the driving force is interruptible, wherein
    the clutch mechanism includes
        a first rotational member and a second rotational member disposed coaxially such that the first rotational member and the second rotational member are rotatable relative to each other, and
        a plurality of clutch plates disposed between the first rotational member and the second rotational member,
    the first rotational member of the clutch mechanism is spline-fitted to the driving force transmission member, and
    wherein the first rotational member includes
        a first cylindrical portion, an outer circumferential side of the first cylindrical portion connecting to at least one of the plurality of clutch plates, and
        a first connector portion that is spline-fitted to the driving force transmission member.

2. The apparatus according to claim 1, wherein
    one of the driving force transmission member and the first rotational member is provided with external teeth, and the other one of the driving force transmission member and the first rotational member is provided with internal teeth, the external teeth meshing with the internal teeth, and
    a circumferential gap is provided between each of the external teeth and an associated one of the internal teeth.

3. The apparatus according to claim 1, wherein the second rotational member includes
    a second cylindrical portion, an inner circumferential side of the second cylindrical portion connecting to at least one of the plurality of clutch plates, and
    a second connector portion that is spline-fitted to a driveshaft of the one of the right and left wheels.

4. The apparatus according to claim 1, wherein the driving force transmission member is an intermediate shaft of the differential gear mechanism.

5. The apparatus according to claim 4, wherein the intermediate shaft and the first connector portion are movable in an axial direction of the intermediate shaft.

* * * * *